(12) United States Patent
Li et al.

(10) Patent No.: US 10,852,150 B2
(45) Date of Patent: Dec. 1, 2020

(54) METHODS AND APPARATUSES FOR FUEL CONSUMPTION PREDICTION

(71) Applicant: Bayerische Motoren Werke Aktiengesellschaft, Munich (DE)

(72) Inventors: Qing Li, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 151 days.

(21) Appl. No.: 16/185,910

(22) Filed: Nov. 9, 2018

(65) Prior Publication Data
US 2019/0145789 A1 May 16, 2019

(30) Foreign Application Priority Data
Nov. 10, 2017 (EP) .................................. 17200999

(51) Int. Cl.
| | | |
|---|---|---|
| *G01C 21/34* | (2006.01) | |
| *G01C 21/36* | (2006.01) | |
| *G06N 5/04* | (2006.01) | |
| *G06N 20/00* | (2019.01) | |
| *G06Q 10/04* | (2012.01) | |

(52) U.S. Cl.
CPC ......... *G01C 21/3469* (2013.01); *G06N 5/046* (2013.01); *G06N 20/00* (2019.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 2009/0204316 A1* | 8/2009 | Klampfl | ............. | G01C 21/3679 701/123 |
| 2012/0078496 A1* | 3/2012 | Lindhuber | ................ | B60L 1/00 701/123 |
| 2012/0209579 A1* | 8/2012 | Fansler | .................. | G06Q 10/04 703/8 |
| 2018/0045525 A1* | 2/2018 | Ara jo | ................ | G01C 21/3469 |

OTHER PUBLICATIONS

Extended European Search Report issued in counterpart European Application No. 17200999.5 dated Jan. 3, 2018 (nine pages).

* cited by examiner

*Primary Examiner* — Adam D Tissot
(74) *Attorney, Agent, or Firm* — Crowell & Moring LLP

(57) ABSTRACT

A fuel consumption prediction method and apparatus is provided. A respective historic fuel consumption is extracted from historic travel data for at least one historic travel path of a vehicle. At least one historic fuel-related quantity influencing the respective historic fuel consumption is extracted from the historic travel data for each historic travel path. Model parameters of a machine learning model for predicting fuel consumption is adjusted based on the extracted respective historic fuel consumption and the at least one historic fuel-related quantity for each historic travel path. The fuel consumption for a planned trip is predicted using the machine learning model with the adjusted model parameters.

18 Claims, 6 Drawing Sheets

FIG. 1

| StartTank Range(km) | EndTank Range(km) | TripLength (km) | Error |
|---|---|---|---|
| 443 | 380 | 89 | 29.2% |
| 474 | 307 | 244 | 31.6% |
| 191 | 167 | 45 | 46.7% |
| 167 | 99 | 49 | 38.8% |
| 476 | 438 | 32 | 18.8% |
| 428 | 425 | 22 | 86.4% |
| 559 | 396 | 240 | 32.1% |
| 432 | 375 | 40 | 42.5% |
| 375 | 363 | 34 | 64.7% |
| 363 | 344 | 33 | 42.4% |
| 312 | 275 | 61 | 39.3% |
| 416 | 309 | 330 | 67.6% |
| 772 | 591 | 162 | 11.7% |
| 591 | 528 | 39 | 61.5% |
| 528 | 420 | 106 | 1.9% |
| 358 | 350 | 33 | 75.8% |
| 298 | 227 | 110 | 35.5% |
| 692 | 351 | 447 | 23.7% |
| 351 | 118 | 167 | 39.5% |
| 735 | 637 | 134 | 26.9% |

FIG. 5

| start Tank Range | end Tank Range | trip Length (km) | car Error | personalized StartTank Range | personalized EndTank Range | personalized Error |
|---|---|---|---|---|---|---|
| 443 | 380 | 89 | 29.2% | 636 | 504 | 49.0% |
| 474 | 307 | 244 | 31.6% | 501 | 301 | 17.9% |
| 191 | 167 | 45 | 46.7% | 167 | 132 | 21.7% |
| 167 | 99 | 49 | 38.8% | 132 | 79 | 7.7% |
| 476 | 438 | 32 | 18.8% | 466 | 431 | 9.9% |
| 428 | 425 | 22 | 86.4% | 422 | 405 | 20.0% |
| 559 | 396 | 240 | 32.1% | 668 | 397 | 13.1% |
| 432 | 375 | 40 | 42.5% | 449 | 378 | 75.9% |
| 375 | 363 | 34 | 64.7% | 392 | 355 | 7.2% |
| 363 | 344 | 33 | 42.4% | 343 | 317 | 20.0% |
| 312 | 275 | 61 | 39.3% | 457 | 408 | 19.6% |
| 416 | 309 | 330 | 67.6% | 560 | 265 | 10.5% |
| 772 | 591 | 162 | 11.7% | 601 | 442 | 1.8% |
| 591 | 528 | 39 | 61.5% | 440 | 405 | 9.7% |
| 528 | 420 | 106 | 1.9% | 407 | 318 | 16.6% |
| 358 | 350 | 33 | 75.8% | 357 | 346 | 66.2% |
| 298 | 227 | 110 | 35.5% | 442 | 344 | 10.7% |
| 692 | 351 | 447 | 23.7% | 581 | 264 | 29.2% |
| 351 | 118 | 167 | 39.5% | 273 | 88 | 10.7% |
| 735 | 637 | 134 | 26.9% | 734 | 612 | 8.7% |

METHODS AND APPARATUSES FOR FUEL CONSUMPTION PREDICTION

CROSS REFERENCE TO RELATED APPLICATION

This application claims priority under 35 U.S.C. § 119 from European Patent Application No. 17200999.5, filed Nov. 10, 2017, the entire disclosure of which is herein expressly incorporated by reference.

BACKGROUND AND SUMMARY OF THE INVENTION

The present disclosure generally relates to the field of transportation and, more particularly, to methods and apparatuses for fuel/battery consumption prediction.

Current fuel tank range can show how many miles a vehicle can presumably still drive based on a past average fuel consumption rate. For example, the remaining fuel tank range might indicate 200 miles left, however it is actually possible to go much more, for example 300 miles, since fuel consumption on a highway with constant speed is considerably below average. On the other hand, the fuel tank range might indicate 200 miles left, but it is actually possible to go only 100 miles before fuel runs out due to presently higher fuel consumption. When referring to "fuel", the skilled person will appreciate that this can refer to fossil fuel as well as electric fuel.

Thus it is desirable to provide more accurate fuel consumption information for upcoming trips. With more accurate fuel consumption information it would be possible to personally and intelligently improve user experience with trip planners since we know whether and when a user should refuel or charge his/her vehicle. Further, user experience with respect to recommend fuel stops could be improved as well as recommend routes by taking into account fuel consumption.

This demand is met by methods, apparatuses and vehicles in accordance with the independent claims. Advantageous embodiments are addressed by the dependent claims.

Embodiments of the present disclosure propose an effective approach to achieve personalized fuel consumption prediction.

According to a first aspect, the present disclosure provides a method of fuel consumption prediction. The method includes extracting, from historic travel data for at least one historic travel path of a vehicle, a respective historic fuel consumption for each historic travel path. The method further includes extracting, from the historic travel data for each historic travel path, at least one historic fuel-related quantity influencing the respective historic fuel consumption. Model parameters of a machine learning model for predicting the fuel consumption are adjusted based on the extracted respective historic fuel consumption and the at least one historic fuel-related quantity for each historic travel path. The fuel consumption for a current trip is then predicted or estimated using the machine learning model with the adjusted model parameters.

The skilled person having benefit of the present disclosure will appreciate that "fuel" may not only relate to fossil fuels but also to electric fuel, for example in the form of battery charge. Thus, embodiments of the present disclosure may be useful for vehicles driven by combustion engines as well as for electric vehicles driven by electric motors for charging prediction.

Embodiments of the present disclosure propose to learn about personal driving history and fuel consumption under different scenarios, such as slope of the road, trip length, speed, acceleration, brake, climate control setting, weather information, fuel type, tire pressure, traffic, traffic control stops, etc. In this way, fuel-related features may be generated that can significantly improve fuel consumption estimation for a specific user with a specific car. Thus, in some example embodiments, extracting the at least one fuel-related quantity can include extracting at least one of a vehicle type, vehicle settings, trip length, travel speed, a number of stops, traffic density, fuel type, driver behavior, road condition, road topology, and weather condition for each historic travel path or the planned trip. These are only a few examples of many features that influence the fuel consumption.

In some example embodiments, predicting the fuel consumption for the current trip can include extracting, from travel data associated with the current trip, at least one current fuel-related quantity and feeding the machine learning model with the current fuel-related quantity. The fuel-related quantity for the current trip could be slope of the road, trip length, (average) speed, acceleration, brake, climate control setting, weather information, fuel type, tire pressure, traffic, traffic control stops, etc. or any combination thereof. There are fuel-related quantities that have more influence on fuel consumption than others. One example of a feature with a higher impact is average speed. Low average speeds typically indicate stop-and-go type traffic and thus higher fuel consumption, for example.

Thus, in some example embodiments, extracting the at least one fuel-related quantity can include extracting an average speed as fuel-related quantity for each historic travel path. Adjusting the model parameters can include adjusting parameters of a Gaussian function $f(x)$ based on the extracted average speed. Thereby, the Gaussian function $f(x)$ can be expressed as $f(x)=a*\exp(-(x-b)^2/2c^2)$, for arbitrary real constants a, b and c.

In some example embodiments, adjusting parameters cons,a,b,c of the Gaussian function can be performed according to $$\operatorname{argmin}_{cons,a,b,c} \sqrt{\sum_i \left(fcr_i - \left(cons + a \times e^{-\frac{(frf_i \cdot AvgSpeed - b)2}{c^2}}\right)\right)^2},$$

wherein $fcr_i$ denotes an extracted historic fuel consumption for historic travel path i and $frf_i \cdot AvgSpeed$ denotes an extracted historic average speed for historic travel path i.

In some example embodiments, the method can further include providing a recommendation related to refueling the vehicle based on the predicted the fuel consumption. For example, the recommendation can be provided via an infotainment system of the vehicle and can comprise predicted fuel consumption, estimated fuel tank range, refuel recommendation, smart trip planning, to ultimately improve user driving experience. Therefore, in some example embodiments, the method can further include providing a recommendation related to selecting a route and/or a time for the planned trip based on the predicted the fuel consumption.

According to a further aspect, it is provided a fuel consumption prediction apparatus. The apparatus comprises processing circuitry which is configured to extract, from historic travel data for at least one historic travel path of a vehicle, a respective fuel consumption for each historic travel path. The processing circuitry is also configured to extract, from the historic travel data for each historic travel path, at least one fuel-related quantity influencing the respective fuel consumption. The processing circuitry is configured to adjust model parameters of a machine learning model for predicting the fuel consumption based on the extracted respective fuel consumption and the at least one fuel-related quantity for each historic travel path. The processing circuitry is configured to predict the fuel consumption for a planned trip using the machine learning model with the adjusted model parameters.

The skilled person having benefit from the present disclosure will appreciate that the fuel consumption prediction apparatus can be an on-board apparatus of a vehicle, such as a car or a truck. Thus, embodiments also comprise a vehicle with a fuel consumption prediction apparatus. In other embodiments, the fuel consumption prediction apparatus can also be a mobile device, such as a tablet PC or a smartphone. The fuel consumption prediction apparatus can comprise or can be coupled to a memory or a database storing the historic travel data. For this, purpose the historic travel data can be accessed via a wired or wireless interface.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a table for different trips with remaining estimated distance before and after a respective trip, an actual trip length, and an estimation error.

FIG. 5 shows a table comparing conventional range consumption prediction with proposed range prediction.

DETAILED DESCRIPTION OF THE DRAWINGS

Figure 2:
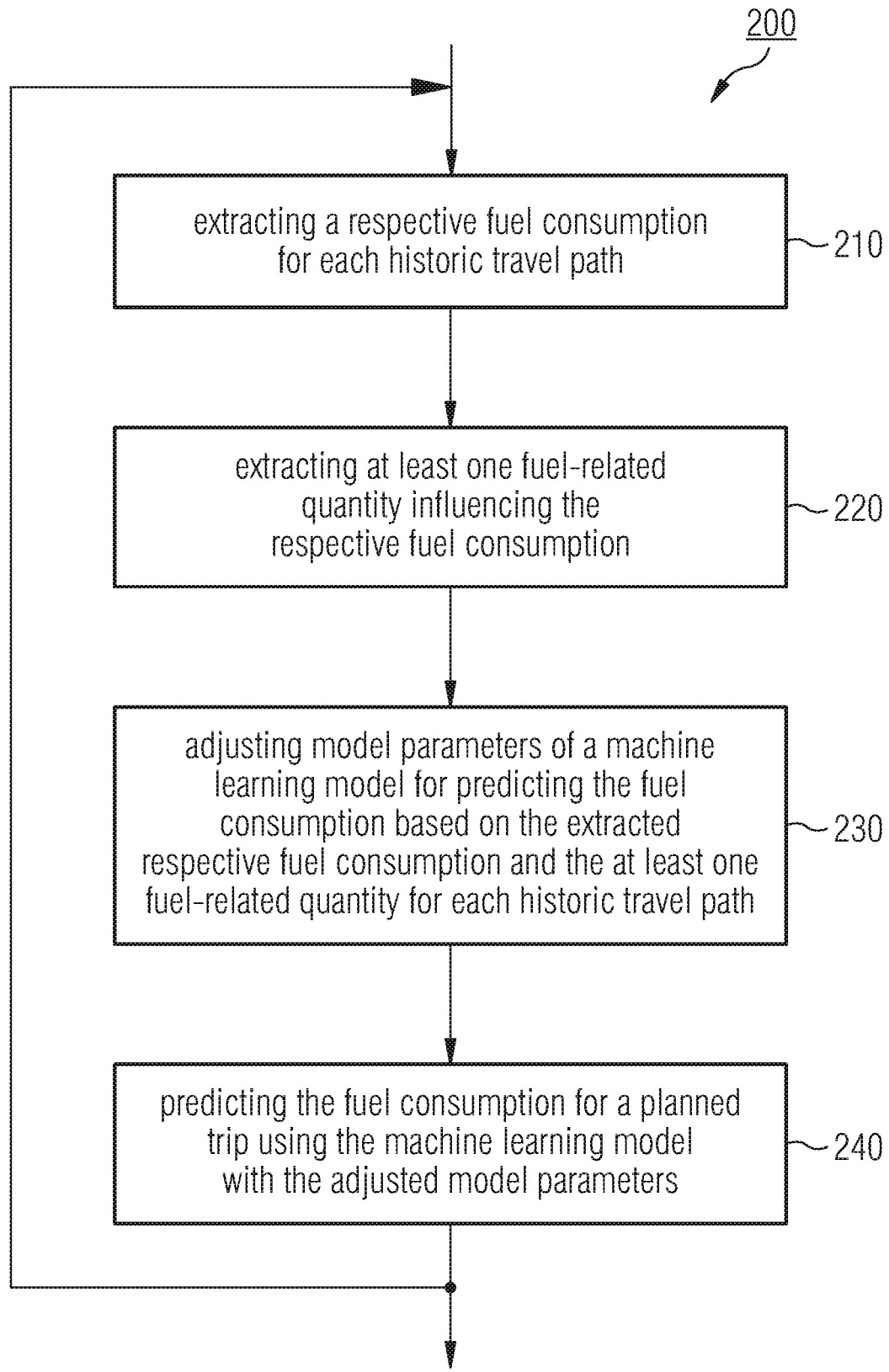
FIG. 2 shows a flow chart of a method of fuel consumption prediction.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Current fuel tank range prediction is often based on a current fuel consumption rate and a remaining amount of fuel in the tank. As can be seen from the table shown in FIG. 1, this conventional type of prediction can lack accuracy, however, since it is not aware of how a current trip and thus the fuel consumption develops in the future. For example, if the user has been driving the vehicle within a city but will enter a long distance highway in the near future, conventional range prediction will be likely to underestimate the remaining range on the highway. Similarly, if the user has been driving with relatively low fuel consumption on a highway so far, but will enter a city soon, the conventional range prediction will be likely to overestimate the remaining range in the city. The table of FIG. 1 shows a remaining estimated distance before and after a respective trip, trip length, and error from trips longer than 20 km by one driver. In the first line of the table, the remaining estimated distance before the trip is 443 km, the remaining estimated distance after the trip is 380 km, resulting in an estimated trip length of 63 km. The actual trip length was 89 km, leading to an error of 29.2%. The average error by using the conventional tank range prediction is 40.2%. In the highlighted case of the table, the tank range shows that a driver only drives 3 km while the actual trip length is 22 km. This leads to bad user experience about what the remaining distance is and may make a wrong decision about when the user should refuel.

The present disclosure proposes to improve fuel range prediction by taking into account historic travel data of historic (or past) trips.

FIG. 2 illustrates a flow chart of a method 200 for predicting a vehicle's fuel consumption.

Method 200 includes and an act 210 of extracting, from historic travel data related to at least one historic travel path of the vehicle, a respective fuel consumption or fuel consumption rate for each historic travel path. The fuel consumption or fuel consumption rate can be measured in liters/km or, vice versa, in km/liter, for example. Other units are also possible, of course. The historic travel data can include geolocation information associated with time stamps. Thus, past travel paths can be recorded and associated with respective measured fuel consumptions of the vehicle.

In order to obtain a finer granularity, a historic travel path can be segmented and respective historic fuel consumptions can be determined for each travel path segment. The segmentation can be performed based on various criteria. One criterion could be topography and/or housing. There may be one or more trip segments related to a city, one or more segments related to rural areas, one or more segments related to highways, etc. In general, the fuel consumption for a city segment may be higher than that for a rural segment. In this way statistical data on fuel consumption for a specific driver and/or a specific car can be learned.

Method 200 further includes an act 220 of extracting, from the historic travel data for each historic travel path or segment thereof, one or more fuel-related quantities influencing the respective historic fuel consumption. Examples of such fuel-related quantities are topography (e.g. slope of the road), (average) vehicle speed, climate control setting, weather conditions, traffic density, tire pressure, fuel type, acceleration behavior, braking behavior, etc. Some of the fuel-related quantities can be obtained by evaluating geolocation information with associated time stamps. An example would be speed. Another example would be acceleration or the slope of the road. Other fuel-related quantities can be obtained by evaluating context associated with the travel data, such as weather or traffic conditions, for example. For the feature extraction, the historic travel paths can also be segmented and respective fuel-related quantities determined for each travel path segment. The skilled person having benefit from the present disclosure will appreciate that the fuel-related quantities will more or less influence the respective fuel consumption. Therefore they can be used as input parameters for an adaptive machine learning model.

In act 230 of method 200, one or more model parameters of a predetermined machine learning model for predicting the fuel consumption can be adjusted based on the extracted respective historic fuel consumption and the at least one historic fuel-related quantity for each historic travel path or segment thereof. In other words, the machine learning model can be adapted to best match the observed historic fuel consumptions given the at least one historic fuel-related quantity as input. The skilled person having benefit from the present disclosure will appreciate that various machine learning models of different complexities are possible. Examples of machine learning models include decision tree models, neural networks, support vector machines, Bayesian networks, etc. Some embodiments may rely on rather simple machine learning models using only one fuel-related quantity as input quantity in order to predict a related fuel consumption as output. On the other hand, if enough computational resources are available, also more complex machine learning models using more than one fuel-related quantity as input quantities may be employed. This may lead to more accurate predictions.

Once the model parameters have been adjusted, the fuel consumption and hence the remaining range for a planned trip may be predicted (see act 240) based on the machine learning model with the adjusted model parameters. Here, one or more fuel-related quantities for the current or planned trip may be input to the model in order to generate the prediction. Examples of such fuel-related quantities for the planned trip are topography (e.g. slope of the road), (average) vehicle speed, climate control setting, weather conditions, traffic density, tire pressure, fuel type, acceleration behavior, braking behavior, etc. They can be obtained via a navigation system and other related services. To generate the one or more fuel-related input quantities, the planned trip may also be segmented into a plurality of trip segments. For example, a first segment of the planned trip may be within a first city. A typical average speed within a city will be low due to stop-and-go traffic. A second segment of the planned trip may correspond to a rural area. A typical average speed within the rural area will be higher than in the city. A third segment of the planned trip may be within a second city, leading to a low average speed again. An overall fuel consumption may be estimated based an average of the fuel-related input quantities (e.g. average speed) for the various segments, for example.

The skilled person having benefit from the present disclosure will appreciate that method 200 may be used iteratively. That is to say, the model parameters can be adjusted or updated whenever new or updated historic travel data is available. Thus, the machine learning model can be improved with an increasing amount of available statistical data.

Figure 3:
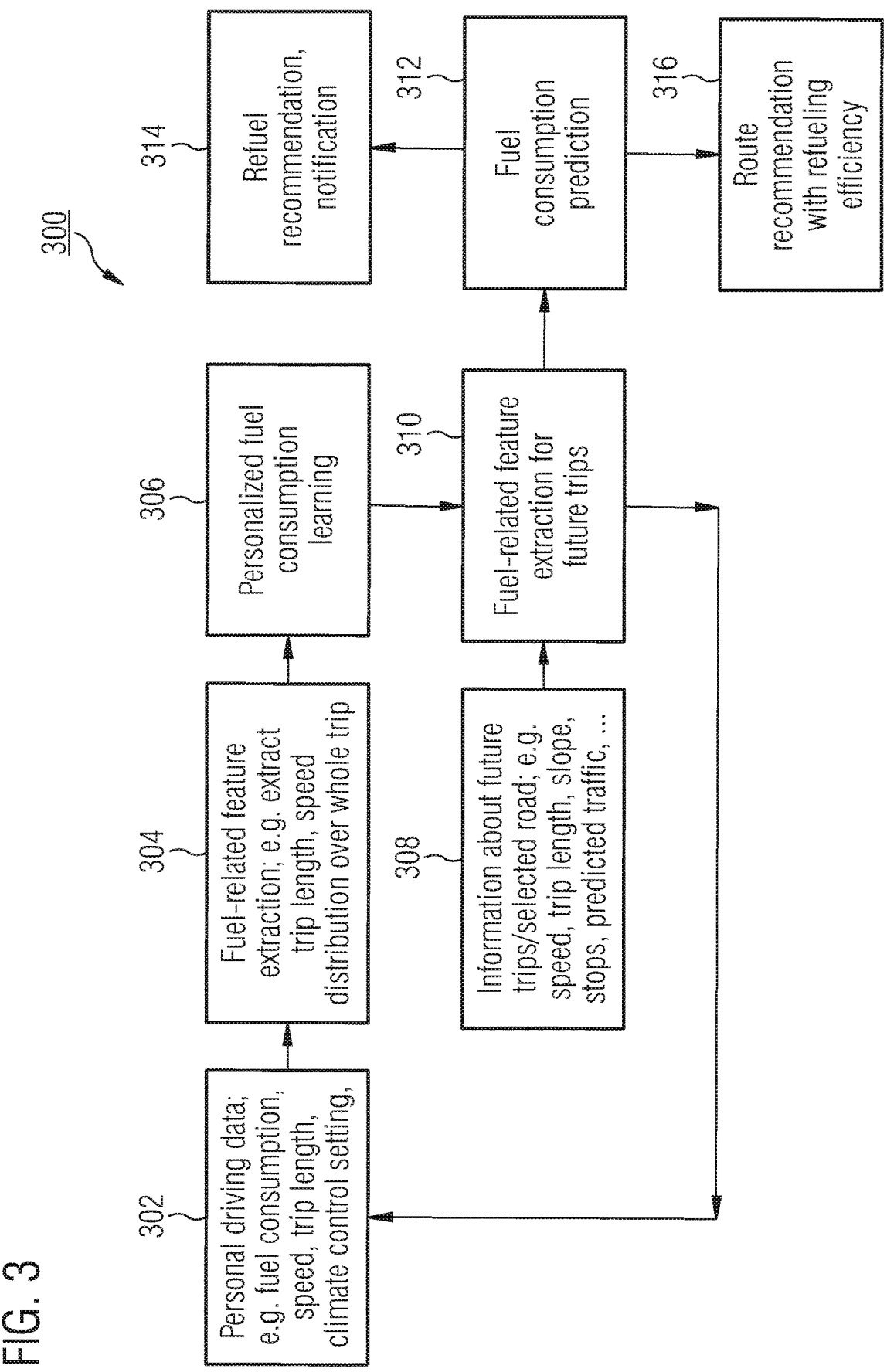
FIG. 3 shows a further chart depicting an exemplary process of fuel consumption prediction.

A more detailed exemplary process 300 is shown in FIG. 3.

Historic travel data is collected and stored in act 302. The historic travel data can comprise data associated with one or preferably more past trips (travel paths) the user has taken. The historic travel data can include geolocation together with time information of the past travel paths from origin to destination. For this purpose on on-board or portable navigation system may be used. The historic travel can further include, per recorded historic travel path, one or more fuel consumptions or fuel consumption rates associated with said travel path or a plurality of segments thereof. For this purpose, a travel path may be associated with respective condition monitoring data of the vehicle (e.g., actual fuel consumption, speed, revolution, tire pressure, fuel type, climate control settings, etc.) and/or other context information (e.g., traffic conditions, road conditions, weather conditions, etc.). The condition monitoring data may be generated by sensor and control circuitry of the vehicle. For example, the actual fuel consumption and speed associated with said travel path or a plurality of segments thereof can be stored as historic travel data. A variety of other fuel-related features or parameters is possible, such as weather information, road and/or traffic condition, etc. Further examples are road information, traffic, traffic stops, acceleration, brakes, etc.

Reference numeral 304 denotes the act of extracting one or more fuel-related features from the previously accumulated and stored historic travel data. As mentioned before, such fuel-related features may include speed distribution over a trip, trip length, topographic distribution, etc. For example, it might be extracted the percentage of speed within the range of 50-60 mph during a trip, the percentage of uphill greater than 2% during a trip, etc. The data may have been collected from different sources, such a navigation system, acceleration sensors, electronic control units (ECUs), etc. For example, the driver's mobile device may be coupled with the car's head unit, for example via cable or via Bluetooth. In this way, various different personal driving data can be determined, e.g. route, brake, acceleration, speed, climate control setting, tank level, fuel consumption rate, etc. Further, the route, associated traffic and/or weather information can be queried from map services during driving.

The results of acts 302 and 304 can then be used for learning a personalized fuel consumption under different scenarios, like speed, traffic, road condition, etc. For this purpose, machine learning algorithms may be used in act 306 to build a personalized relationship between these fuel-related features and fuel consumption rate for a specific user with a specific car.

What has been done in acts 302, 304 for historic trips can be done for future or planned trips in acts 308 and 310. This means that future travel data for future or planned trips may be generated in act 308, for example using a navigation system. Act 310 may include extracting one or more fuel-related quantities from the future travel data, such as travel speed or outside temperature, for example. The extracted one or more fuel-related quantities from the future travel data may be fed to the machine learning model in act 312 in order to predict the fuel consumption of the planned trip(s).

After predicting fuel consumption for the future trips, smart recommendation or notifications for the consumers can be provided in act 314. For example, if a user has several trips in the upcoming day or a scheduled long trip, the system can recommend whether and when the user should refuel or charge. This can be done via a cars head unit, for example.

The personalized fuel consumption of act 312 can also be used for route recommendation in act 316. Other than travel time, the users might also care about the fuel consumption for the selected routes. Fuel efficient routes can be recommended for the users by predicting personalized fuel consumption for different routes under different scenarios, e.g. traffic, trip length, travel time, for example.

For each historic trip i, at least one fuel-related feature can be extracted in act 304 and represented as $frf_i$, which can contain travel speed distribution, stop number, traffic, brake, acceleration, fuel type, etc. The label $fcr_i$ denotes the fuel consumption rate of trip or trip segment i. A machine learning algorithm can be used in act 306 to learn a personalized fuel consumption model for a specific user in a specific vehicle.

The following illustrates an example model for predicting the fuel consumption rate using a Gaussian function and average speed as fuel-related feature. An actual fuel consumption rate $fcr_i$ of trip i corresponds to an estimated fuel consumption rate $\widehat{fcr_i}$ plus error $\varepsilon_i$, i.e., $$fcr_i = \widehat{fcr_i} + \varepsilon_i = cons + a \times e^{-\frac{(frf_i \cdot AvgSpeed - b)2}{c^2}} + \varepsilon_i.$$

Here cons denotes a personalized base fuel consumption rate and b denotes an personalized eco speed.

The objective now is to minimize the error between actual and predicted fuel consumption rate, i.e., $$\min err = \sqrt{\sum_i \varepsilon_i^2} = \sqrt{\sum_i \left(fcr_i - \left(cons + a \times e^{-\frac{(frf_i \cdot AvgSpeed - b)2}{c^2}}\right)\right)^2}.$$

Thus, the model parameters cons, a, b, and c can be determined based on $$\operatorname{argmin}_{cons,a,b,c} \sqrt{\sum_i \left(fcr_i - \left(cons + a \times e^{-\frac{(frf_i \cdot AvgSpeed - b)2}{c^2}}\right)\right)^2}.$$

Thereby the following constraints may apply:

0 ≤ cons ≤ maxFuelConsumptionRate

0 ≤ b ≤ maxFuelConsumptionRate

0 ≤ cons+b ≤ maxFuelConsumptionRate

For example, gradient algorithms, such as the generalized reduced gradient algorithm, may be used to determine the model parameters cons, a, b, and c.

Figure 4:
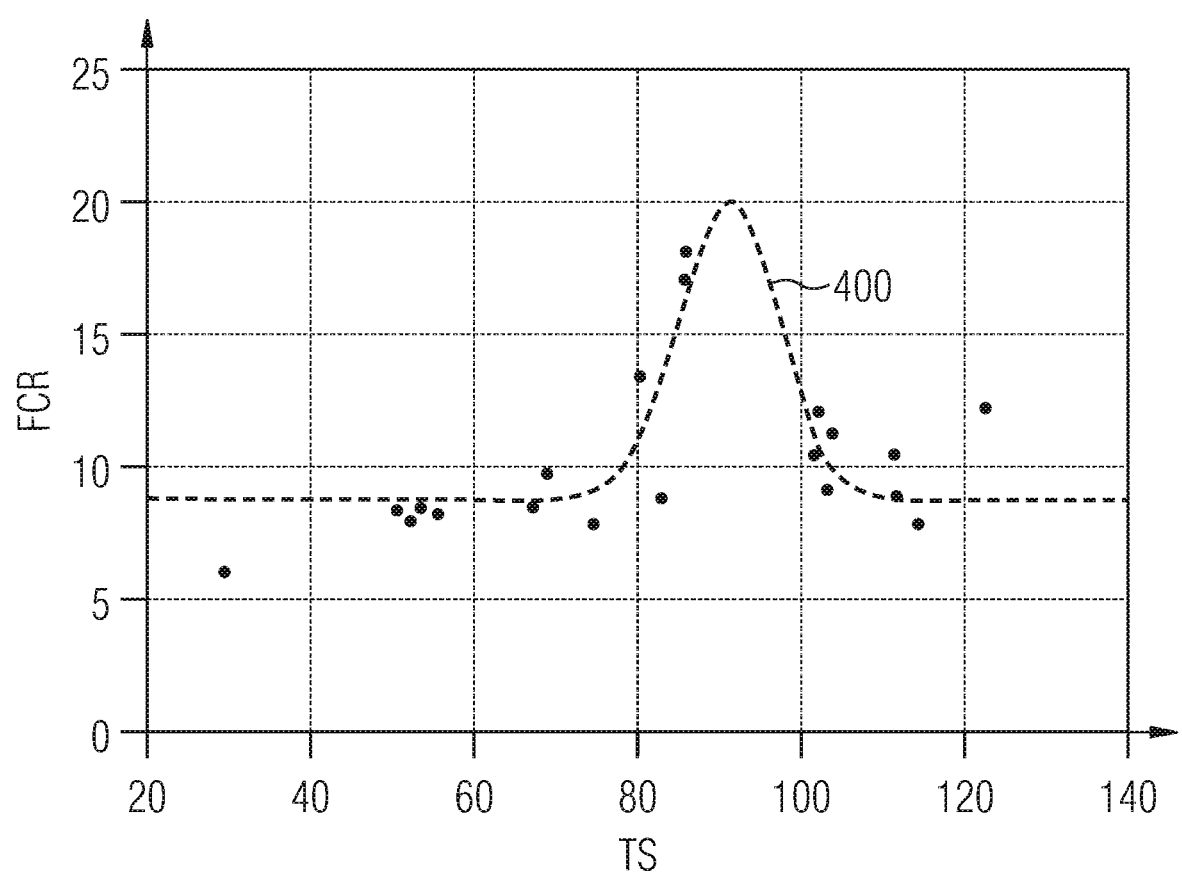
FIG. 4 illustrates an example of a parameterized Gaussian function for predicting the fuel consumption rate.

An example of a parameterized Gaussian function 400 for predicting the fuel consumption rate is shown in FIG. 4. The plurality of dots around curve 400 correspond to actual measured historic fuel consumption rates. In the illustrated example, the predicted fuel consumption rate FCR of a planned trip can be computed based on a current or planned trip's (average) travel speed TS according to $$FCR = 8.8 + 11.2 \times e^{-\frac{(TS-91.3)2}{6.2^2}}.$$

Thus, the determined model parameters here are cons=8.8, a=11.2, b=91.3, and c=6.2. In this example, the base fuel consumption rate is 8.8 km/liter. The eco speed b leading to maximum range or fuel consumption rate of 20 km/liter is b=91.3 km/h. Thus, the fuel consumption rate FCR is depending on the travel speed TS, which can be a current or planned trip's average travel speed. The former can be determined based on a sliding average of the vehicle's speed, for example. The later can be predicted based on route information, traffic information, weather information, which may be available via a vehicle's navigation system, for example. The functional relationship of FIG. 4 can be explained as follows: Low average travel speeds can be regarded as an indicator for city-centric trips. High percentages of stop-and-go traffic within cities usually cause higher fuel consumption, thus less km/liter. Average travel speeds close to the eco-speed typically indicate trips with only a little percentages of stop-and-go traffic, such as highway trips or trips in rural areas. Average speeds higher than eco-speed may indicate trips on highways at high speed, thus higher fuel consumption (less km/liter).

The predicted tank range can be calculated by using the remaining tank level and the personalized fuel consumption rate for the planned trips. For example, the fuel consumption rate for a planned trip (via a navigation system) may be determined to be 15 km/liter. In the example of FIG. 4, this may be done based on a predicted average speed for said trip (e.g. 83 km/h). The average speed may be predicted based on historic travel data and/or predictions of a navigation system, for example. Given a remaining fuel level of 20 liters, the predicted range will then be 300 km.

The table in FIG. 5 compares the results of the conventional fuel consumption rate prediction method of FIG. 1 with the example embodiment based on the Gaussian function and the average trip speed as fuel-related feature. It can be seen that the average prediction error improves from 40.8% to 21.3%.

Figure 6:
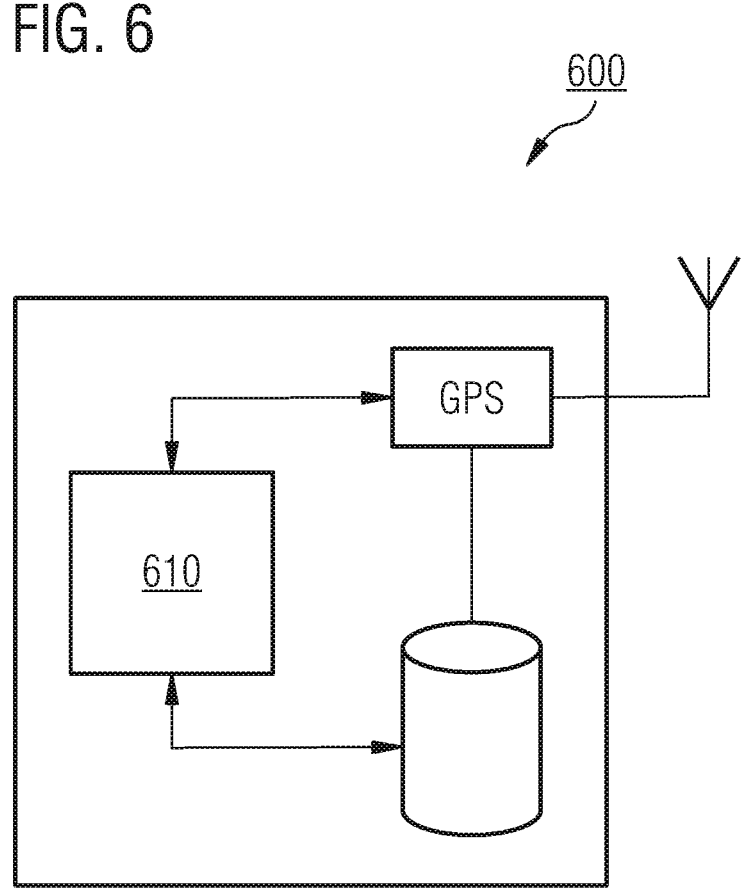
FIG. 6 shows a block diagram of an apparatus for fuel consumption prediction.

The skilled person having benefit from the present disclosure will appreciate that embodiments of the fuel prediction concept can be implemented into a navigation system. This can be a navigation system built into a vehicle or a navigation system running on a portable device such as a smartphone. A schematic block diagram of such a navigation apparatus 600 is shown in FIG. 6.

Apparatus 600, which can be a vehicle or a smartphone, for example, comprises processing circuitry 610 which is configured extract, from historic travel data for at least one historic travel path of a vehicle, a respective fuel consumption for each historic travel path. Thus, processing circuitry 610 can comprise computer memory or storage. Processing circuitry 610 is further configured to extract, from the historic travel data for each historic travel path, at least one historic fuel-related quantity influencing the respective historic fuel consumption and to adjust model parameters of a machine learning model for predicting the fuel consumption based on the extracted respective historic fuel consumption and the at least one historic fuel-related quantity for each historic travel path. Thus, processing circuitry 610 can comprise one or more CPUs. Processing circuitry 510 is further configured to predict the fuel consumption for a planned trip using the machine learning model with the adjusted model parameters.

Embodiments of the present disclosure offer approaches where the fuel consumption can be predicted based on user and vehicle profile learned from historical driving data as well as context information extracted from predicted and scheduled next trips. Thus, embodiments can estimate more accurate fuel consumption information that enables personalized, intelligent and contextual awareness services.

Embodiments propose self learning and adaptation algorithms. A learning-based framework for personalized fuel consumption prediction is provided. Instead of simply adding rule-based fuel consumption adjustment compared with optimal state, the model is able to learn automatically from user's behavior, vehicle characteristics and route information, i.e. to leverage the data from user, vehicle and context over history big data.

Embodiments can improve user driving experience by providing more accurate mileage estimation over current tank range that may be one of basic features shown in the vehicle dashboard.

Embodiments can be regarded as an enabler to bring the personal, intelligent and context-awareness differentiation. Embodiments can be used for trip planning, personal smart fuel stop recommendation along the route, so that user does not need to manually check fuel level and search for fuel stops during driving. It can also be used for route recommendation by considering fuel consumption of each candidate route, and proactively notify user relevant info at right time, right place and right situation.

The skilled person having benefit from the present disclosure will appreciate that embodiments are also applicable to electric vehicle for battery and charging management.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of fuel consumption prediction, the method comprising the acts of:
    extracting via processing circuitry of the vehicle, from historic travel data for at least one historic travel path of a vehicle, a respective historic fuel consumption for each historic travel path;
    extracting via the processing circuitry of the vehicle, from the historic travel data for each historic travel path, at least one historic fuel-related quantity influencing the respective historic fuel consumption;
    adjusting via the processing circuitry of the vehicle, model parameters of a machine learning model for predicting the fuel consumption based on the extracted respective historic fuel consumption and the at least one historic fuel-related quantity for each historic travel path;
    predicting via the processing circuitry of the vehicle, the fuel consumption for a planned trip using the machine learning model with the adjusted model parameters; and
    providing a recommendation via an output device of the vehicle based on the predicted fuel consumption for the planned trip, wherein
        adjusting the model parameters of the machine learning model further comprises:
            determining a first parameter corresponding to a base fuel consumption rate of the vehicle based on the historic travel data, and
            determining a second parameter corresponding to a speed at which the vehicle achieves its maximum range based on the historic travel data, and
        the historic travel data is acquired by at least one of a navigation system of the vehicle, a sensor of the vehicle, a mobile device of a driver of the vehicle, or an electronic control unit of the vehicle.

2. The method of claim 1, wherein
predicting the fuel consumption for the planned trip comprises extracting, from travel data associated with the planned trip, at least one current fuel-related quantity and feeding the machine learning model with the current fuel-related quantity.

3. The method of claim 1, wherein
the provided recommendation is related to refueling the vehicle based on the predicted the fuel consumption.

4. The method of claim 1, wherein
the provided recommendation is related to selecting a route and/or a time for the planned trip based on the predicted fuel consumption.

5. The method of claim 1, wherein
extracting the at least one fuel-related quantity comprises extracting at least one of a vehicle type, vehicle settings, trip length, travel speed, a number of stops, traffic density, fuel type, driver behavior, road condition, road topology, and weather condition for each historic travel path or the planned trip.

6. The method of claim 1, wherein
extracting the at least one fuel-related quantity comprises extracting an average speed as fuel-related quantity for each historic travel path and wherein adjusting the model parameters comprises adjusting parameters of a Gaussian function based on the extracted average speed.

7. The method of claim 6, wherein adjusting parameters of the Gaussian function is performed according to:

$$\mathrm{argmin}_{cons,a,b,c} \sqrt{\sum_i \left( fcr_i - \left( cons + a \times e^{-\frac{(frf_i \cdot AvgSpeed - b)2}{c^2}} \right) \right)^2},$$

wherein cons, a, b, c respectively denote the first, the second, a third, and a fourth model parameter, $fcr_i$ denotes an extracted historic fuel consumption for historic travel path i and $frf_i \cdot AvgSpeed$ denotes the extracted average speed for historic travel path i.

8. A fuel consumption prediction apparatus, the apparatus comprising:
    processing circuitry configured to:
        extract, from historic travel data for at least one historic travel path of a vehicle, a respective fuel consumption for each historic travel path;
        extract, from the historic travel data for each historic travel path, at least one historic fuel-related quantity influencing the respective historic fuel consumption;
        adjust model parameters of a machine learning model for predicting the fuel consumption based on the extracted respective historic fuel consumption and the at least one historic fuel-related quantity for each historic travel path;
        predict the fuel consumption for a planned trip using the machine learning model with the adjusted model parameters; and
        provide a recommendation via an output device of the vehicle based on the predicted fuel consumption for the planned trip, wherein
            the processing circuitry is configured to adjust the model parameters of the machine learning model by:
                determining a first parameter corresponding to a base fuel consumption rate of the vehicle based on the historic travel data, and
                determining a second parameter corresponding to a speed at which the vehicle achieves its maximum range based on the historic travel data, and
            the historic travel data is acquired by at least one of a navigation system of the vehicle, a sensor of the vehicle, a mobile device of a driver of the vehicle, or an electronic control unit of the vehicle.

9. The method of claim 1, wherein adjusting the model parameters further comprises:
    determining at least one of a third parameter or a fourth parameter such that an error component of the predicted fuel consumption for the planned trip is minimized, wherein
        the error quantity is a function of the first, second, third, and fourth parameters.

10. The apparatus of claim 8, wherein the processing circuitry is further configured to adjust the model parameters by:
   determining at least one of a third parameter or a fourth parameter such that an error component of the predicted fuel consumption for the planned trip is minimized, wherein
   the error quantity is a function of the first, second, third, and fourth parameters.

11. The method of claim 1, wherein
the first parameter summed with the second parameter is less than or equal to a maximum fuel consumption rate of the vehicle.

12. The apparatus of claim 8, wherein
the first parameter summed with the second parameter is less than or equal to a maximum fuel consumption rate of the vehicle.

13. The apparatus of claim 8, wherein the processing circuitry is further configured to predict the fuel consumption for the planned trip by:
   extracting, from travel data associated with the planned trip, at least one current fuel-related quantity and feeding the machine learning model with the current fuel-related quantity.

14. The apparatus of claim 8, wherein
the provided recommendation is related to refueling the vehicle based on the predicted the fuel consumption.

15. The apparatus of claim 8, wherein
the provided recommendation is related to selecting a route and/or a time for the planned trip based on the predicted the fuel consumption.

16. The apparatus of claim 8, wherein the processing circuitry is further configured to extract the at least one fuel-related quantity by:
   extracting at least one of a vehicle type, vehicle settings, trip length, travel speed, a number of stops, traffic density, fuel type, driver behavior, road condition, road topology, and weather condition for each historic travel path or the planned trip.

17. The apparatus of claim 8, wherein the processing circuitry is further configured to extract the at least one fuel-related quantity by:
   extracting an average speed as fuel-related quantity for each historic travel path and wherein adjusting the model parameters comprises adjusting parameters of a Gaussian function based on the extracted average speed.

18. The apparatus of claim 17, wherein the processing circuit is further configured to adjust parameters of the Gaussian function according to:

$$\mathrm{argmin}_{cons,a,b,c} \sqrt{\sum_i \left( fcr_i - \left( cons + a \times e^{-\frac{(frf_i \cdot AvgSpeed - b)2}{c^2}} \right) \right)^2} ,$$

wherein cons, a, b, c respectively denote the first, the second, a third, and a fourth model parameter, $fcr_i$ denotes an extracted historic fuel consumption for historic travel path i and $frf_i \cdot AvgSpeed$ denotes the extracted average speed for historic travel path i.

* * * * *